United States Patent

[11] 3,615,701

[72] Inventor Worth C. Goss
 4704 Lake Washington Blvd., Kirkland, Wash. 98033
[21] Appl. No. 673,006
[22] Filed Oct. 5, 1967
[45] Patented Oct. 26, 1971

[54] MAPLE FLAVORING CONCENTRATE AND METHOD FOR MAKING SAME
 17 Claims, No Drawings
[52] U.S. Cl. .................................................. 99/142, 99/140
[51] Int. Cl. .................................................. A23l 1/26
[50] Field of Search ............................................ 99/140, 142

[56] References Cited
 UNITED STATES PATENTS

| | | | |
|---|---|---|---|
| 2,054,873 | 9/1936 | Whitby .......................... | 127/30 |
| 2,237,981 | 4/1941 | Ellis et al. ..................... | 99/142 |
| 3,340,093 | 9/1967 | Cortis-Jones ................. | 127/30 |

OTHER REFERENCES

Agriculture Handbook #134, Maple Syrup Producers Manuel, January 1958, pages 22–25.

*Primary Examiner*—Raymond N. Jones
*Assistant Examiner*—Roger B. Andewelt
*Attorney*—Graybeal, Cole & Barnard ABSTRACT: Maple flavoring concentrate product and method for making same wherein four, five and six carbon reducing sugars, principally five carbon, are subjected to controlled oxidation and dehydration steps, giving a controlled caramelization. Dehydration may be carried out separately or simultaneously with oxidation though oxidation is accomplished in an alkaline solution with the pH maintained by calcium or barium hydroxide. After dehydration and oxidation the calcium or barium ions are removed from the solution to give a relatively strong acid pH. Finally the solution is adjusted to a weak acid pH by the addition of food grade potassium, sodium or calcium hydroxides or carbonates to give the maple flavoring concentrate.

MAPLE FLAVORING CONCENTRATE AND METHOD FOR MAKING SAME

BACKGROUND OF THE INVENTION

Numerous efforts have been made over the years to concentrate natural maple flavor and odor and to intensify its strength for more widespread use and economical distribution. Genuine maple syrup and maple sugar are, per unit volume, greatly lacking in flavoring strength. Hence their use in confections, bakery goods and other foodstuffs has been restricted. Substantial work has been devoted to the development of concentrates of imitation flavors, but by and large they have not been successful for a number of reasons, including failure to duplicate the delicate flavor and aroma of true maple, expense, lack of sufficient concentrate strength, or for having physical properties which do not otherwise lend themselves to the requirements of industry.

U.S. Pat. No. 2,446,478 relates to a maple flavor made from reducing saccharides reacted with alpha amino acid in a substantially anhydrous molten state. U.S. Pat. No. 2,895,833 involves intensified maple flavoring made from either maple sap syrup or maple sugar. U.S. Pat. No. 2,715,581 concerns making maple flavoring from bland syrup. Pat. No. 1,957,405 concentrates maple syrup and then crystallizes it into maple flavored sugar. U.S. Pat. No. 2,078,215 is directed to a maple concentrate coating on sugar particles. Pat. No. 2,880,094 subjects maple sap to controlled fermentation and from the fermented sap preparing maple syrup of enhanced flavor. Other patents of interest are Nos. 1,037,766; 2,103,495; 2,179,203; and 3,057,734.

SUMMARY OF THE INVENTION

This invention relates to a maple flavoring concentrate and method for its making. More particularly does the invention relate to a maple flavoring concentrate and method for its making in which the beginning materials are maple sap, maple syrup, leaves, maple leaves, lower reducing sugars and their precursors and derivatives, and including invert sugar sucrose, spent sulfite liquors, and other commonly known origins from which said lower reducing saccharides may be extracted easily and inexpensively. It has been found that vegetable and woody sources having a high pentosan content are particularly good for producing a maple flavoring comparable to the true odor and taste of natural maple.

It is, therefore, a prime feature of this invention to provide a concentrate of true maple flavor. Another feature of this invention is to supply a unique and novel process for making maple flavor concentrate which is able to utilize plentiful and low cost sources of reducing saccharides, mixtures of natural sugar extracts, and other chemically pure sugars. Still another feature of this invention is to furnish a maple concentrate of many times normal strength which is suitable for flavoring in syrups and other food products in general. Yet another feature of this invention is to provide a concentrate which can be tableted and added to dry food preparations. It is a further feature of this invention to serve as a carrier for minerals such as potassium, sodium and calcium. These, and other features, advantages and objects will be apparent from the following detailed discussion, examples and claims.

DESCRIPTION OF PREFERRED EMBODIMENTS

Preparation of the maple flavoring concentrate is begun either by first dehydrating the sugar molecules under controlled condition followed by oxidation, or, alternatively, what amounts first to dehydrating and then oxidizing the beginning saccharide molecules in the a single step. If the controlled dehydration and oxidation steps are carried out separately, dehydration is accomplished by autoclaving an aqueous solution of reducing saccharides and mixtures thereof selected from the group consisting of pentoses, hexoses, and tetroses. It has been found that a wide range of source materials may be employed since the basic requirement is the extraction therefrom of four, five, and six carbon reducing sugars. Thus, leaves, maple sap, maple leaves, sucrose split to invert sugar, sugars extracted from spent sulfite liquors, sugars from plants, fruits and vegetables, and other sources are readily usable. Autoclaving is conducted at pressures ranging from about five to approximately 150 p.s.i.g. for a period of about 20 to 75 minutes. In dehydrating the sugars it is desirable to avoid excessive acid formation. Water, in the amount of two molecules, is removed from each sugar molecule although some single dehydration occurs also. There is no precise indication as to what happens during autoclaving, but it is known that $H_2O$ and minor amounts of $CO_2$ are evolved and that some acid is formed. The solution at the end of the autoclaving is a clear brown color and has a pH of about 1.5 to 5. Acidity developing during the dehydration stage indicates the formation of naturally occuring organic acids. Precipitates appearing during dehydration should be filtered out.

Following dehydration the pH of the solution is adjusted to a range of about 9 to 11 with calcium, barium or magnesium hydroxide. The use of divalent ions such as calcium, barium, or magnesium protects the carboxyl groups in the solution from being lost in the form of carbon dioxide. The preferable but not critical need at this state of the process is an alkaline pH solution for easy promotion of the oxidation. After adjustment to an alkaline pH of preferably about 11, the solution is boiled for approximately 30 to 40 minutes while oxygen or air is bubbled through the solution to oxidize the uncarboxylated groups. At the temination of the alkaline oxidation, the pH of the solution will be no lower than approximately 8.0. The solution is still a clear brown color. Precipitates are removed. During this second stage of the dehydration-oxidation step the pH will drop to about 8 to evidence some development of acidity. Stabilization of pH indicates the oxidation is substantially completed. Alternative oxidation can be accomplished with bacterial mould.

The oxidation and dehydration phases can be combined into what amounts to a single step. An aqueous solution of the starting sugar material is made containing in the range of about 10 to 25 percent reducing sugar by weight. To the dilute solution of sugar and water is added sufficient barium hydroxide to raise the pH of the solution into the range of about 8 to 12. The solution is then heated approximately to 70° C if barium hydroxide is used or to approximately 100° C if calcium oxide is employed, at which temperature oxygen or air is then introduced and continuously bubbled into and through the solution. The solution is gradually brought to and maintained at a boiling temperature. The time of the cook is not critical although it has been determined that the cook may require from as little as 40 to 50 minutes to perhaps as much as 2 hours. The pH of the solution is tested frequently and additional dilute amounts of barium, calcium, or magnesium hydroxide in solution may be added during the course of the cook in order not to overdehydrate and thus turn the boiling solution to a too viscous and unworkable semisolid. Barium hydroxide in solution may continue to be added until the pH remains steady at about 8 to 9. Oxidation should then be complete. The air or oxygen is bubbled through the solution for the entire period of the cook beginning with its introduction. The point at which dehydration is terminated is empirically determined. In the five and six carbon saccharide chains double dehydration takes place. In the four carbon molecule single dehydration takes place. The time period ranges set forth have been found to give the desired amount of dehydration. Where $Ba(OH)_2$ is added as described in a single cook, dehydration apparently begins to take place immediately upon heating and dehydration is bound to take place even after oxygen is introduced and the solution brought to a boil. Over dehydration will also result in the formation of lactic acid.

The second step in this process is to precipitate barium, calcium or magnesium ion from the solution by the addition of sulfuric acid in the case of barium, and oxalic acid in the case of calcium or magnesium. The acid is preferably added while the solution is hot and precipitation and filtering may have to be repeated several times until no precipitation occurs by the addition of barium or by the addition of sulfuric acid. The filtrate remaining after removal of the barium is a clear brown solution of distinct maple flavor. The solution may be permitted to stand for some period of time, perhaps as much as several days, since there may be some residual reaction involving barium and the formation of undesirable precipitates. Refiltering after standing will remove such impurities. At this stage of the pH of the solution after the addition of acid to remove barium is approximately in the range of 1.5 to 3. In nontechnical language the above treatment results in controlled caramelization.

The third stage 59 preparation of this maple flavoring concentrate is then to adjust the pH of the final filtered solution to approximately 5 to about 6.5, with alkaline minerals. Thus, food grade potassium, sodium and calcium hydroxides or carbonates, may be added to raise the pH to approximately 5 to 65 which gives sufficient stability to the solution to hold the acids and lactones in equilibrium. Minerals in the form of potassium, sodium and calcium also improve the flavor. There is believed to be formed by the addition of the alkaline substances, an acid salt which exists in equilibrium with the acid and with the acid lactone. The maple flavoring may then be evaporated in order to form the final viscous brown flavoring concentrate.

Mechanisms for the production of maple flavoring from four, five and six carbon sugars are presented in the following equations and formulae. An equilibrium mixture of four, five and six carbon, alpha-beta, conjugated carboxylic acids and lactones is thought to be responsible for the maple flavor. Shorter carbon chains result in increased fragrance. Oxidation should be continued until all sugar reducing groups are converted to carboxyl groups. During the alkaline stage of cooking as where dehydration and oxidation are separated a pH drop from 11 to 10 has been observed indicating some oxidation has occurred. Acidity developed as suggested by pH changes.

In the four carbon reaction path, single dehydration occurs to give the acid, acid salt, and lactone in equilibrium. It is believed that the keto from of the organic acid together with its lactone and acid salt will also exist in the equilibrium. It is further believed that the keto tautomers of the acids in both the five and six carbon paths will exist in equilibrium together with their acid salts and lactones.

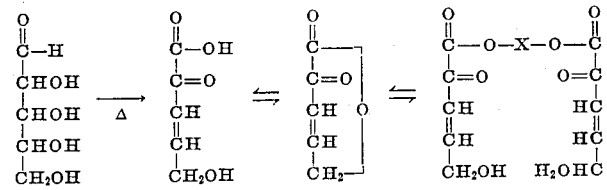

In the five carbon reaction path, using D-xylose as an illustration, double dehydration takes place.

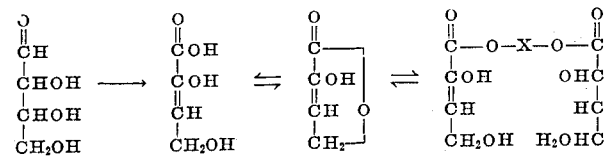

Six carbon sugars such as both glucose and fructose show double dehydration reaction paths. In the case of fructose the terminal carbon atom next to the keto carbon splits off to give a five carbon equilibrium.

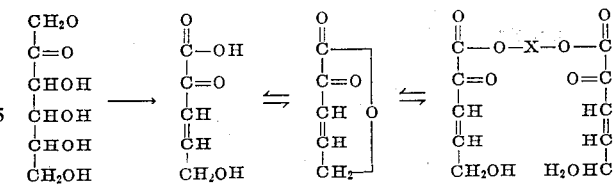

The by-products of oxidation, i.e., nonflavor contributing acid and aldehyde radicals, are eliminated by complete oxidation to form carbon dioxide and by precipitation according to the following mechanism.

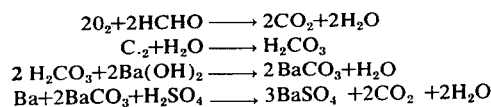

The six carbon aldo sugar such as glucose has the following path.

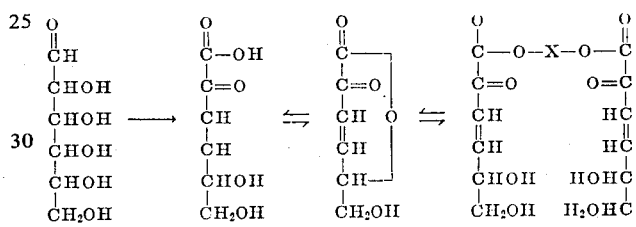

In each case if the acid salt, the divalent ion X in the above reaction paths, designating either sodium, calcium or potassium, will combine with two of the carbon chains to give the acid salt.

EXAMPLE 1

One hundred and eighty grams of sugar solids from maple sap syrup (approximately 98% sucrose) were inverted under 80 p.s.i. for 20 minutes and the solids then dissolved in 1500 ml. of water. To this dilute solution was added 100 grams of hydrated $Ba(OH)_2$ 8 $H_2O$ in 500 ml. of water. The pH of this solution was then at A approximately 11. The solution was slowly heated to 70° C at which time bubbling oxygen was introduced into the solution. The solution was then brought into the solution. The solution was then brought gradually to a boil. At the termination of approximately 40 minutes a sample was removed from the boiling solution and tested for pH which was found to be 7.9. An additional 150 grams of barium hydroxide in 400 ml. of water were added to the solution. At the termination of about 70 minutes the pH was again tested and found to be approximately 7.9. Again 50 grams of barium hydroxide in 400 ml. of water were added to the solution. At the expiration of 90 minutes the pH was tested three times at 5-minute intervals and found to be unchanged at approximately 8.0 on all three readings thus indicating that oxidation was substantially complete. At this point all formic acid produced from the fructose should have been converted to $BaCO_3$.

The solution was then removed from the burner and sufficient sulfuric acid added to precipitate the barium ions. The solution was then filtered and small quantities of dilute $H_2SO_4$ again introduced to remove any possible residual barium ions. After filtering it was found that a clear brown solution remained having a pH of approximately 1.5. The solution was cooled and minerals in the form of food grade potassium hydroxide, sodium hydroxide, and calcium hydroxide were added in substantially equal quantities to raise the pH to 6.0. Three tasters out of ten indentified this product as good maple when one part was mixed with 400 parts of sugar.

EXAMPLE II

One hundred and eighty grams of invert sugar were dissolved in 1500 ml. of H$_2$O. The sucrose may be made into invert sugar either by autoclaving or more conventionally by cooking in the presence of an acid. Precipitates were removed by filtering before the invert sugar was subjected to the same procedures as set forth in example I.

EXAMPLE III

One hundred and eighty grams of sugar solids from maple sap syrup were inverted, as in example I, and the solids then dissolved in 1,500 ml. of water. To this dilute solution was added 36 grams of CaO. The pH of this solution was then at approximately 11. The solution was slowly heated to 100° C. at which time bubbling oxygen was introduced into the boiling solution. At the termination of approximately 40 minutes a sample was removed from the boiling solution and tested for pH which was found to be above 9.0. At the expiration of 90 minutes the pH was tested three times at 5-minute intervals and found to be unchanged at approximately 8.0 on all three readings thus indicating that oxidation was substantially complete. The solution was then removed from the burner and sufficient oxalic acid added to precipitate the calcium ions. The solution was then filtered and small quantities of dilute oxalic acid again introduced to remove any possible residual calcium ions. After filtering it was found that a clear brown solution remained having a pH of approximately 1.5. The solution was cooled and minerals in the form of food grade potassium hydroxide, sodium hydroxide, and calcium hydroxide were added in substantially equal quantities to raise the pH to 6.0. Taste tests showed the same results as example I.

EXAMPLE IV

In using the sugars derived from dried but not necessarily partially decomposed maple leaves, it was necessary to first separate the sugars before subjecting them to the process of this invention. A slurry of leaves in water was formed and autoclaved at about 100 p.s.i. Autoclaving was controlled so that dehydration was held to a minimum and so that humin and furfural were not formed. The saccharide content of dried partially decomposed maple leaves is essentially five-carbon sugars. The leaves were slightly acidic and the sugars separated during this controlled autoclaving were dissolved. The leaf residue after autoclaving was then separated from the liquid portion and the liquid evaporated to form a ratio of about 16 percent sugar solids in solution. Barium hydroxide was added to bring the pH of the concentrated solution to about 9 at ambient temperature and precipitates resulting therefrom were removed by filtering. Thus the extracted sugars from the maple leaves were in an essentially purified liquid state for treatment in accordance with the principles of this invention.

The pH of the purified leaf liquid was raised to about 11 with the addition of Ba(OH)$_2$ and then heated to 70° C. At that temperature bubbling oxygen was introduced to the solution and the solution brought to a gentle boil. Oxygen continued to be bubbled through the boiling solution until the pH was found to be constant at about 8.0 based on three tests spaced at 5-minute intervals. The barium was precipitated with sulfuric acid until all traces of barium ion were removed. The pH of the solution was then adjusted to 6.0 with approximately equal additions of alkaline potassium, sodium and calcium ion. The resulting solution was a dark clear brown in color and exhibited distinct maple aroma and taste. When a sugar syrup was made from the product, 9 out of 10 tasters stated it was a superior maple syrup.

EXAMPLE V

Whole dried maple leaves were pressed into blocks and digested with standard CaHSO$_3$ pulping liquor at 134° C. under about 80 pounds of SO$_2$ pressure for 2 hours. The solid were washed after separation and discarded. To the liquor was added sufficient lime to raise the solution pH to 12.0 thus precipitating CaSO$_3$ and lignins. The solution was filtered and Ca in the filtrate removed by oxalic acid. The resultant solution was passed through an ion exchange column to remove traces of acid. The final solution was basically five carbon leaf sugars.

After isolation of the sugars from the liquor in this essentially conventional pulping process, the solution was treated in accordance with paragraph two of example IV resulting in a maple flavoring concentrate of great strength.

When maple wood or leaf is sulfite pulped as much as 15% of the dry solids of the spent pulp liquor may be xylose and arabinose. Much smaller amounts of galactose, mannose, and d-glucose are also produced. This sugar content may be separated and purified by the well known diacetone sugar separation process.

EXAMPLE VI

Forty grams each of glucose, mannose and galactose were separately dissolved in 5 liters of water. Each solution was autoclaved at 150 p.s.i.g., the galactose solution for 75 minutes and the mannose and glucose each for 40 minutes. At the conclusion of the dehydration step, in which the solution had a pH of about 3 to 4, the pH readings were adjusted with Ba(OH)$_2$ to 10. Oxygen was then bubbled through the alkaline solution while it was being boiled. The alkaline cook and oxidation was continued until there ceased to be any change in pH. Final pH readings were 7 to 8. The solutions were filtered and H$_2$SO$_4$ added to slight excess. Back titration with Ba(OH)$_2$ eliminated both barium and sulfite ions. The solutions each had a weak characteristic odor of authentic maple flavor. In taste tests, 3 out of 10 tasters identified the syrup as good maple.

EXAMPLE VII

Twenty-five grams of d-xylose and 12.5 grams of l-arabinose were dissolved in approximately 6 liters of water. The solution was autoclaved under anerobic conditions for 75 minutes at 140 p.s.i.g. At the conclusion of the cook, approximately 4 liters of brown colored solution at pH 3 were recovered (test sample 1). Thirty-six grams of hydrated barium hydroxide were added to this brown colored solution, giving a pH of 11. The alkaline solution was then boiled 30 minutes with oxygen gently bubbling through. The final pH was 10. Excess sulfuric acid was added to precipitate the barium and the excess sulfuric acid removed by back titration with barium hydroxide. A few grams of Celite were added to the solution and the solution filtered. The pH of the filtrate, identified as test sample 2, was 3. The precipitate, identified as test sample 3, was also collected.

From the filtrate (test sample 2) were prepared two 200 milliliter chloroform extracts. One extract was made at pH 5.8 while the other was made at pH 4.0. Both of the 200 milliliter samples were evaporated to dryness at 0° C, in a rotary evaporator. The dry samples had the characteristic odor of authentic maple syrup. A maple syrup was prepared by boiling 300 milliliters of the filtrate at pH 6 with 500 grams of cane sugar for 3 minutes. The product had a strong characteristic odor of authentic maple syrup. The taste of this sample was almost identical to that of true maple syrup, when blended with sugar.

EXAMPLE VIII

Three grams of d-erythrose were dissolved in 100 milliliters of distilled water at pH 4.5 and the pH of the solution adjusted to 3.0 dropwise addition of dilute sulfuric acid. The colorless, acidified, diluted d-erythrose solution was gently heated on hot plate for 3 hours at 100° C., during which time it developed a yellow to brown color. After cooling, the d-erythrose solution was adjusted to pH 12.0 with a saturated solution of barium hydroxide. This sample was again heated at 100° C. for 30 minutes while air was bubbled through it. After cooling the solution was found to have a pH of 4.5. Dilute sulfuric acid was added to the solution until no further barium sulfate precipitation occurred. The resulting solution was filtered and its pH adjusted to 6.5 with potassium hydroxide. The solution was subjected to chloroform extraction in a separator funnel. The chloroform layer was evaporated to dryness. A strong maple odor was present in the dry chloroform extract, but could not be found in the aqueous fraction.

EXAMPLE IX

Maple leaves are placed in an autoclave and wetted with 2% sulfuric acid, cooking is then carried out at about 7 atmospheres of steam pressure and cooking continued until just before furfural may be detected. The autoclave is cooled and the leaves washed with water and filtered therefrom. The sulfuric acid is removed from the brown solution by any of several well-known methods.

Food grade lime was added to the solution as in example III, filtered, and oxidized until all sugar reducing groups were converted to carboxyl groups. This results in a delicate and well controlled caramelization of the sugars derived from the leaves which predominate in zylose and arabinose, also present are mannose, galactose, and d-glucose.

What is claimed is:

1. A process for making maple flavoring concentrate from at least one of the group consisting of four, five and six carbon reducing saccharide molecules and mixtures thereof, comprising:
   a. heating an aqueous solution of about 10 to about 25 percent by weight of said reducing saccharides to effect controlled dehydration of said molecules and after heating has begun bubbling oxygen through said solution for sufficient time to oxidize uncarboxylated groups in said solution while maintaining the solution above a pH of approximately 7.9 by addition of a suitable base,
   b. removing undesirable ions and other contaminants from said solution by precipitation with a suitable acid and filtration and thereafter adjusting and stabilizing said solution to a pH range of about 5.0 to 6.5 by addition of a suitable alkaline material.

2. The process according to claim 1 and in which in step (a) said pH above about 7.9 is maintained by alkaline substances having ions selected from the group consisting of barium, calcium and magnesium.

3. The process according to claim 1 and in which in step (b) undesirable ions are precipitated from said solution by an acid selected from the group consisting of sulfuric and oxalic acids.

4. The process according to claim 1 and in which in step (a) said pH is maintained by barium hydroxide.

5. The process according to claim 1 and in which in step (a) said pH is maintained by calcium oxide.

6. The process according to claim 4 and in which in step (b) precipitation is effected by sulfuric acid.

7. The process according to claim 5 and in which in step (b) precipitation is effected by oxalic acid.

8. The process according to claim 1 and in which in step (b) adjustment and stabilization of said pH range is effected by addition of at least one of the alkaline hydroxides containing ions selected from the group consisting of potassium, sodium and calcium.

9. A process for producing maple flavoring concentrate from at least one of the group consisting of four, five and six carbon reducing saccharide molecules and mixtures thereof, comprising:
   a. heating at a pressure of from about five to about 150 p.s.i.g. an aqueous solution of about 10 to about 25% by weight of at least one of said reducing saccharides for a time sufficient to produce controlled dehydration decomposition products,
   b. adjusting the heated solution to an alkaline pH value in a range of above about 8.0 'with a suitable base to facilitate oxidation,
   c. heating said solution and bubbling oxygen through said alkaline solution while it is being heated for sufficient time to oxidize uncarboxylated groups in said solution,
   d. separating insoluble impurities and precipitates from said solution and thereafter adjusting the pH of said solution to a range of about 5.0 to about 6.5 by addition of suitable alkaline material.

10. The process according to claim 9 and in which in step (a) said decomposition is controlled to a single dehydration decomposition of four carbon molecules and double dehydration of five and six carbon molecules.

11. The process according to claim 9 and in which in step (b) said pH is adjusted by the addition of barium hydroxide.

12. The process according to claim 9 and in which in step (b) said pH is adjusted by the addition of calcium oxide.

13. The process according to claim 9 and in which in step (c) said solution is heated to a boil 14. The process according to claim 13 and in which in step (c) said solution is both heated and bubbled with oxygen until the pH thereof remains approximately constant.

15. The process according to claim 9 and in which in step (d) adjustment of the pH value of said solution is effected by the addition of food grade hydroxides and carbonates containing ions selected from the group containing sodium, potassium and calcium.

16. A process for producing maple flavoring concentrate from at least one of the group consisting of four, five and six carbon reducing saccharide molecules and mixtures thereof, comprising:
   a. heating to a boil an aqueous solution of about 10 to about 25% by weight of at least one of said reducing saccharides under a pressure of at least about 5 p.s.i.g. for a time sufficient to produce controlled dehydration of said molecules and to give an acid pH value in said solution,
   b. after dehydration, adjusting the heated solution to an alkaline pH value of about about 9.0 with alkaline solution containing divalent ions selected from the group consisting of calcium, barium and magnesium,
   c. bubbling oxygen through said heated solution while maintaining its alkalinity to promote oxidation of said dehydrated molecules until the pH of said solution is approximately steady at about 8.0 to about 9.0, and
   d. precipitating said divalent ions from said solution by the addition of acid selected from the group consisting of sulfuric and oxalic acids, and then separating said precipitates and other insoluble impurities from said solution and thereafter adjusting the pH of said solution to to range of about 5.0 to about 6.5 with food grade hydroxide and carbonates having ions selected from the group consisting of calcium, potassium and sodium.

17. A process for making maple flavoring concentrate, comprising:
   a. extracting natural sugars from at least one of the group consisting of (1) maple leaves, (2) woody substances, (3) vegetable materials, and (4) high pentosan content woody substances, and mixtures thereof,
   b. heating an aqueous solution of about 10 to about 25 percent by weight of at least one of said reducing saccharides at a pressure of from about 5 to about 150 p.s.i.g. for a time sufficient to produce controlled dehydration decomposition products,
   c. adjusting the heated solution to an alkaline pH value in the range of above about 8.0 with suitable alkaline material,
   d. heating said solution and bubbling oxygen through said alkaline solution while it is being heated to oxidize said dehydration decomposition products, and
   e. separating insoluble impurities and precipates from said solution and thereafter adjusting the pH of said solution to a range of about 5.0 to about 6.5 by the addition of a suitable alkaline material.

* * * * *